Jan. 3, 1933. D. B. LINVILLE ET AL 1,893,093
ELECTRIC SOLDERING TOOL
Filed Nov. 15, 1929
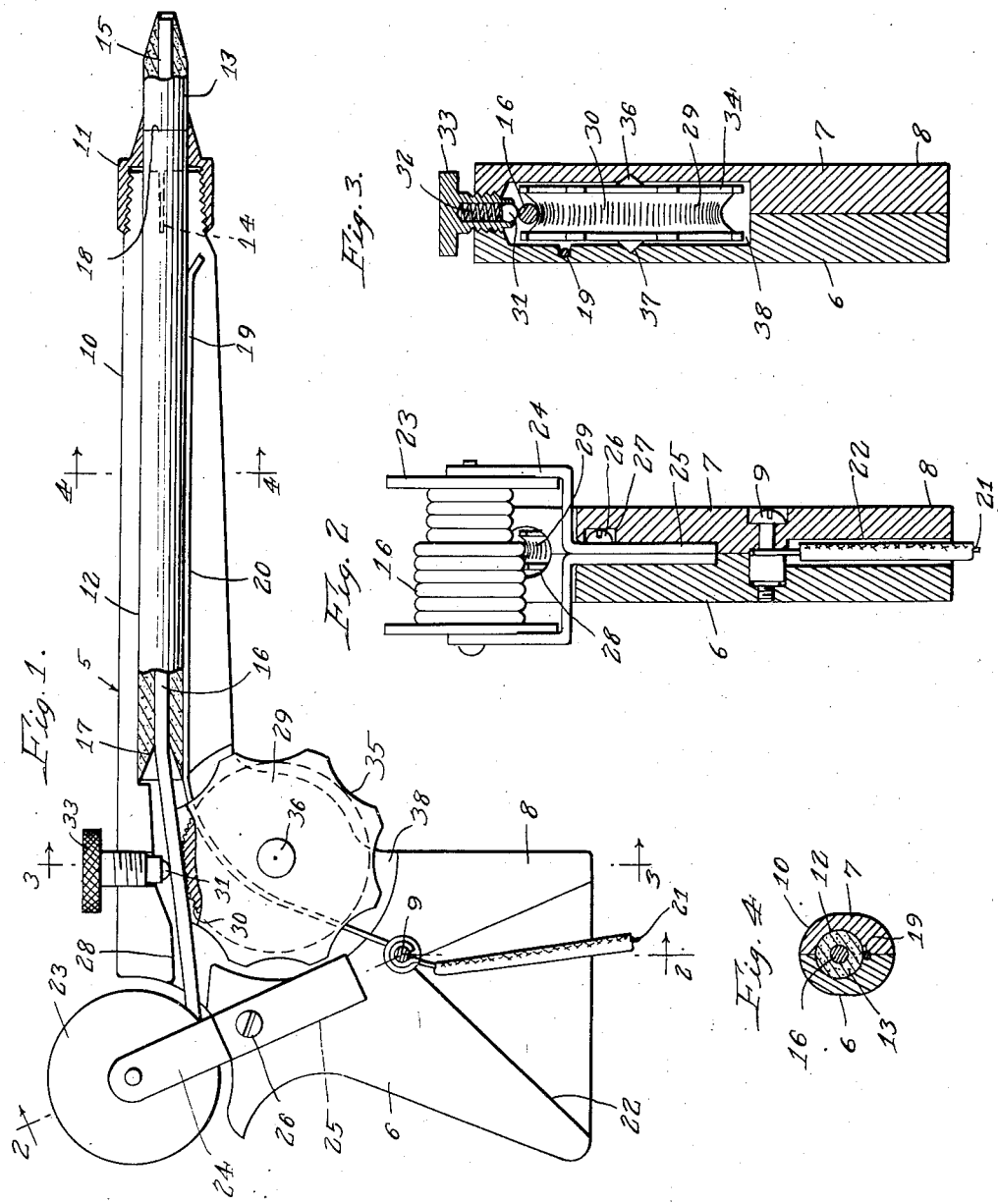
Inventors:
Darrell B. Linville
By Bert C. Canty
Wilson, Dowell, McCanna & Rehm Attys.

Patented Jan. 3, 1933

1,893,093

UNITED STATES PATENT OFFICE

DARRELL B. LINVILLE AND BERT C. CANTY, OF ROCKFORD, ILLINOIS

ELECTRIC SOLDERING TOOL

Application filed November 15, 1929. Serial No. 407,343.

Our invention relates to a novel type of electric soldering tool.

Soldering irons have been devised providing for the feeding of the solder in wire form from a coil on the tool through the tool to the head end so as to flow onto the work directly from the tool, thereby avoiding the necessity for a stick of solder to be held in one hand and the soldering iron in the other hand and arranged to be applied to the solder to cause it to flow onto the work. Most of these prior devices proved impractical for various reasons and have not gone into extensive use. Aside from the usual objection that they were complicated and expensive there was the objection that the metallic head required cleaning every time the tool was used because the solder adhered thereto and, of course, it was difficult to clear the solder passage in the head. It is, therefore, the principal object of our invention to provide an electric soldering tool dispensing with the usual metallic head and providing a hollow cored carbon stick as the soldering element through which the wire solder is arranged to be fed to the soldering end that is brought into contact with the work and thereby grounded and heated to bring about the melting of the solder and the flowing thereof onto the work. The fact that the solder will not adhere to the carbon entirely eliminates the matter of cleaning which, as stated above, was the outstanding objection to the prior devices. Furthermore, the fact that the carbon stick will heat only at the very end thereof when brought in contact with the work insures against the likelihood of solder being wasted, and the fact that no current is consumed excepting when the tool is actually brought into contact with the work means, of course, an appreciable saving in operating expense and avoids any fire hazard in case the tool is left lying about with the current turned on.

Another important object of our invention consists in so arranging the carbon stick soldering element in a barrel with relation to a solder wire feed roll at one end of the barrel that the tool can be made in pistol form, the feed roll being operable similarly to a trigger for the step by step feeding of the solder. Incidental to this design may be mentioned the provision of a gland nut at the muzzle arranged to be tightened to clamp the carbon stick soldering element in adjusted position in the barrel. Also worthy of mention is the fact that the design permits forming the entire body of the tool in two halves arranged to be quickly and easily assembled together, a single screw at the butt and the gland nut at the muzzle sufficing to hold the halves together.

The foregoing and other objects and advantages of our invention will appear in the course of the following specification in which reference is made to the accompanying drawing, wherein—

Figure 1 is a longitudinal section through a tool embodying our invention; and

Figs. 2, 3 and 4 are transverse sections taken on the lines 2—2, 3—3 and 4—4 of Fig. 1.

The same reference numerals are applied to corresponding parts throughout the views.

The tool has the pistol shaped body 5 formed in two halves 6 and 7 dividing the same in a longitudinal median plane. These halves are substantially counter-parts and are preferably molded of rubber or any other suitable material and arranged to be fastened together at the butt 8 by means of a screw 9 and at the muzzle end of the barrel 10 by means of a gland nut 11, all of the other parts of the tool being held in place between the two halves. The barrel 10 has a cylindrical bore 12 in which a carbon stick 13 is slidably received and arranged to be clamped in adjusted position by the tightening of the gland nut 11, the muzzle end of the barrel 10 being preferably split, as indicated at 14, to permit contraction sufficient for the clamping of the stick. The carbon stick 13 is similar to what are used in arc lamps excepting that it is centrally cored, as shown at 15, to permit the feeding therethrough of solder wire 16, the rear end of the stick being counterbored, as represented at 17, to facilitate entering the solder wire in the stick. The stick is also copper-coated on the outside almost the full length thereof, as appears at 18. This improves electrical contact with a copper wire 19 fitting in a groove 20 extending longitudinally of the bore 12 on the lower side of the barrel 10. The wire 19 leads back to the screw 9, which serves as a terminal screw and an insulated wire 21 is also connected with the screw 9 and constitutes one wire of an extension cord arranged to be attached to any nearby socket, the other wire of the extension cord being arranged to be attached to the work. The pistol butt 8 is cored out from the bottom thereof, as shown at 22, so that the tool can be poined in different directions and moved about with greater freedom, the wire 21 being free to move back and forth in the space 22. The solder wire 16 is on a spool 23 mounted on a bracket 24 suitably supported in the butt 8 in a recess 25 provided therefor. The screw 26 which serves to fasten the two halves of the bracket 24 together with the spool mounted therein is arranged to enter a recess 27 in one half of the body 5, as shown in Fig. 2, and thereby prevent withdrawal of the bracket. The wire 16 is extended from the spool 23 through a hole 28 provided at the rear end of the barrel 10 almost in line with the bore 12, and a feed roll 29 is provided on the butt 8 for feeding the solder wire from the spool step by step through the carbon stick soldering element 13. The roll 29 has a grooved, transversely serrated periphery, as represented at 30, to grip the wire sufficiently to feed it positively, and a ball 31 bearing on the wire 16 is arranged to press it against the roll under the action of a coiled compression spring 32 mounted in a plug 33 screwed into the top of the barrel 10 at the rear end of the latter. The ball 31 with the spring 32 behind it is permanently assembled in the bore of the plug 33, the outer end of the plug being peened to retain the ball with the spring in the bore. If desired, the side flanges 34 of the feed roll 29 may have the peripheries thereof notched out, as shown at 35, to serve as finger recesses to facilitate turning of the roll a predetermined amount upon each operation. The roll has central conical projections 36 arranged to be received in conical recesses 37 in the two halves of the body 10 to serve as bearings for the mounting of the roll. The two halves of the body 10 are suitably recessed, as shown at 38, to accommodate the roll, only a portion of the periphery of the roll being exposed at the butt 8 for finger operation similarly to the operation of a trigger.

In operation, it is evident that the tool can be operated held in one hand like a pistol. The operator touches the work with the muzzle end of the tool and the moment the carbon stick 13 is grounded in that way the soldering end thereof becomes heated and glows and the end of the solder wire 16 melts and the solder flows onto the work. As the solder is used the operator feeds the wire forward through the stick 13 by turning the roll 29 with his trigger finger. The tool is obviously very handy to use. The carbon stick soldering element 13 is arranged, as it is gradually used up, to be adjusted in the barrel 10 by simply loosening the nut 11 to make the desired adjustment and tightening the nut to clamp the stick in adjusted position. Inasmuch as the contact wire 19 reaches almost to the muzzle end of the barrel 10, the carbon stick 13 maintains contact with it until the stick is reduced to a small stub, which is then thrown away and a new stick inserted. The operation of the tool is not attended with any of the objections of the so-called self-feeding soldering irons heretofore devised, chief among which was the objection that the tool had to be cleaned periodically because the solder adhered to the metallic head. The use of the carbon stick as the soldering element entirely eliminates that serious objection because solder will not adhere to carbon. Furthermore, the fact that the carbon stick soldering element heats from the tip inwardly and only when it is brought in contact with the work, insures against wasting of solder, only the very end of the solder wire being melted. Another advantage of the present tool is that there is bound to be less current consumed inasmuch as current is used only when the tool is brought into contact with the work, and there may be also mentioned the fact that this feature eliminates fire hazard in the event the tool happens to be left lying about with the current turned on. The tool operates equally well with alternating or direct current and there is, therefore, no need for concern on the part of the operator as to the kind of current available on any particular job.

It is believed the foregoing description conveys a clear understanding of our invention and of its important advantages over the devices of the prior art. The following claims have been drafted with a view to affording sufficient protection to cover all legitimate modifications and adaptations coming within the spirit and scope of the invention.

We claim:

1. An electric soldering tool comprising a carbon stick soldering element having a longitudinal passage therethrough to the tip thereof adapted to be used in soldering, a holder for said stick from which the stick is extensible whereby to permit adjustment of the stick as the same is burned away at the tip, and means for supplying electric current to said stick to heat the same at the tip by contact with the work, solder in wire or equivalent form being adapted to be extended through the longitudinal passage in said stick to the tip of the latter.

2. An electric soldering tool comprising a carbon stick soldering element having a longitudinal passage therethrough to the tip thereof adapted to be used in soldering, a holder for said stick from which the stick is extensible whereby to permit adjustment of the stick as the same is burned away at the tip, means for supplying electric current to said stick to heat the same at the tip by contact with the work, and means on the holder for feeding solder in wire or equivalent form through the passage in said stick to the tip thereof in any position of adjustment of said stick.

3. An electric soldering tool comprising a holder of pistol form arranged to be held in the hand like a pistol, a hollow cored carbon stick serving as the soldering element slidably received in a bore provided in the barrel portion of said holder, said stick being arranged to be extended from the barrel portion a desired amount and adjusted gradually outwardly as the tip burns away, means for fastening the stick in adjusted position, an electrical contact in said holder extending lengthwise of the bore of the barrel portion and making contact with the stick in the different positions of adjustment of the latter, said stick being arranged to be heated at the tip by contact with the work and being arranged to have solder in wire or equivalent form fed through the core thereof to the tip, and solder feed means operable at the pistol butt portion after the manner of a trigger.

4. An electric soldering tool comprising a holder of pistol form arranged to be held in the hand like a pistol, a hollow cored carbon stick serving as the soldering element slidably received in a bore provided in the barrel portion of said holder, said stick being arranged to be extended from the barrel portion a desired amount and adjusted gradually outwardly as the tip burns away, means for fastening the stick in adjusted position, an electrical contact in said holder extending lengthwise of the bore of the barrel portion and making contact with the stick in the different positions of adjustment of the latter, said stick being arranged to be heated at the tip by contact with the work and being arranged to have solder in wire form fed through the core thereof to the tip, a spool of solder wire rotatably mounted on the pistol butt portion of said holder with the solder wire extended therefrom to the barrel portion and through the core of the carbon stick, and a feed roll rotatably mounted in the pistol butt portion with the periphery thereof projecting from the holder below the barrel portion and in front of the butt portion for finger operation after the manner of a trigger, said roll having engagement with the solder wire be feed it forwardly through the carbon stick.

5. A device as set forth in claim 4 including means on the holder for yieldingly urging the solder wire against the feed roll to facilitate feeding thereof.

6. A device as set forth in claim 4 wherein the muzzle end of the barrel portion is split and wherein the means for holding the carbon stick in adjusted position comprises a gland nut threading on the muzzle end of the barrel and arranged when tightened to contract said end sufficiently to clamp the carbon stick in place.

7. A device as set forth in claim 4 wherein the said holder is made in two halves dividing the holder in a longitudinal median plane, there being means for securing the halves of the holder together with the carbon stick and the other elements of the tool assembled therebetween.

8. An electric soldering tool comprising a holder having a longitudinal bore, a carbon stick soldering element slidably received in said bore to permit extension thereof from the holder the desired distance and the adjustment thereof from the holder gradually as the stick burns away at the tip, means for fastening the stick in adjusted position in the holder, and an electrical contact in said holder extending lengthwise of the bore so as to have contact with the stick in its different adjusted positions, said stick being arranged when brought into contact with the work to be heated at the tip for soldering purposes.

9. A tool as set forth in claim 8 wherein the carbon stick is provided with a passage extending longitudinally therethrough for the purpose of feeding solder through the stick to the tip thereof.

10. An electric soldering tool comprising a holder of pistol form arranged to be held in the hand like a pistol, said holder being made in two halves dividing the same in a longitudinal median plane, a gland nut threading on the muzzle end of the barrel portion of said holder for holding the halves together, a carbon stick slidably received in the bore provided in the barrel portion and entered through the gland nut, said nut being arranged when tightened to draw the halves of the holder together to clamp the stick in adjusted position, and means for supplying electric current to said stick whereby to heat the same at the tip thereof when it makes grounding contact with the work.

11. A tool as set forth in claim 10 wherein the carbon stick is provided with a passage extending lengthwise therethrough and wherein the holder has a passage therein leading to the rear end of the bore of the barrel portion whereby to permit the extension of solder wire or the equivalent through the holder and through the carbon stick of the latter.

12. A tool as set forth in claim 10 wherein the carbon stick is provided with a passage extending lengthwise therethrough and wherein the holder has a passage therein leading to the rear end of the bore of the barrel portion whereby to permit the extension of solder wire or the equivalent through the holder and through the carbon stick of the latter, said tool including a spool for the solder wire, and a bracket for said spool extending rearwardly and upwardly from the butt portion of the holder and secured in place between the halves thereof.

13. A tool as set forth in claim 10 wherein the carbon stick is provided with a passage extending lengthwise therethrough and wherein the holder has a passage therein leading to the rear end of the bore of the barrel portion whereby to permit the extension of solder wire or the equivalent through the holder and through the carbon stick to the tip of the latter, said tool including a feed roll rotatably received between the halves of said holder in a recess in the front of the butt portion and below the barrel portion, said roll having one portion of the periphery thereof arranged to engage the solder wire and having another portion of the periphery thereof projecting from the holder for finger operation.

14. A tool as set forth in claim 10 wherein the carbon stick is provided with a passage extending lengthwise therethrough and wherein the holder has a passage therein leading to the rear end of the bore of the barrel portion whereby to permit the extension of solder wire or the equivalent through the holder and through the carbon stick to the tip of the latter, said tool including a feed roll rotatably received between the halves of said holder in a recess in the front of the butt portion and below the barrel portion, said roll having one portion of the periphery thereof arranged to engage the solder wire and having another portion of the periphery thereof projecting from the holder for finger operation, said tool including a spool for the solder wire, and a bracket for said spool extending rearwardly and upwardly from the butt portion of the holder and secured in place between the halves thereof.

15. A tool as set forth in claim 10 wherein the carbon stick is provided with a passage extending lengthwise therethrough and wherein the holder has a passage therein leading to the rear end of the bore of the barrel portion whereby to permit the extension of solder wire or the equivalent through the holder and through the carbon stick to the tip of the latter, said tool including a feed roll rotatably received between the halves of said holder in a recess in the front of the butt portion and below the barrel portion, said roll having one portion of the periphery thereof arranged to engage the solder wire and having another portion of the periphery thereof projecting from the holder for finger operation, said tool including a spool for the solder wire, and a bracket for said spool extending rearwardly and upwardly from the butt portion of the holder and secured in place between the halves thereof.

16. An electric soldering tool comprising a carbon stick soldering element having a longitudinal passage therethrough to the tip thereof adapted to be used in soldering, a holder for said stick leaving the tip thereof exposed for contact with the work, the said stick being adjustable endwise in the holder whereby to keep a certain portion of the length thereof extending from the holder as the stick burns away at the tip, a contact in the holder with relation to which the stick is arranged to be adjusted, the stick remaining in engagement with the contact throughout substantially the entire range of its adjustment, and means for supplying electric current to the contact whereby to heat the stick at the tip when the same makes grounding contact with the work, solder in wire or equivalent form being adapted to be extended through the longitudinal passage in said stick to the tip thereof.

17. An electric soldering tool comprising a holder of pistol-like form arranged to be held in the hand like a pistol, a hollow cored carbon stick serving as the soldering element mounted in the barrel portion of said holder with the tip thereof exposed for contact with the work, means for supplying electric current to the stick whereby to heat the same at the tip when it makes grounding contact with the work, solder in wire or equivalent form being arranged to feed through the core of said stick to the tip to be melted and flow onto the work, and solder feed means operable at the pistol butt portion after the manner of a trigger.

18. An electric soldering tool comprising a holder of pistol-like form arranged to be held in the hand like a pistol, a hollow cored carbon stick serving as the soldering element mounted in the barrel portion of said holder with the tip thereof exposed for contact with the work, means for supplying electric current to the stick whereby to heat the same at the tip when it makes grounding contact with the work, solder in wire or equivalent form being arranged to feed through the core of said stick to the tip to be melted and flow onto the work, a feed roll rotatably mounted on the pistol butt portion of the holder so that the periphery thereof is arranged to be turned as the holder is held in the hand, the said roll having solder wire thereon arranged to feed forwardly through the core in the carbon stick.

19. An electric soldering tool comprising a holder of pistol-like form arranged to be held in the hand like a pistol, a hollow cored carbon stick serving as the soldering element mounted in the barrel portion of said holder with the tip thereof exposed for contact with the work, means for supplying electric current to the stick whereby to heat the same at the tip when it makes grounding contact with the work, solder in wire or equivalent form being arranged to feed through the core of said stick to the tip to be melted and flow onto the work, and a feed roll rotatably mounted on the holder behind the carbon stick, the same having solder wire thereon extending therefrom forwardly through the carbon stick, the said roll being arranged to be turned as the holder is held in the hand.

20. An electric soldering tool comprising an elongated holder providing a longitudinal bore, a carbon stick soldering element slidably received in said bore leaving the tip thereof exposed for contact with the work, the said holder being split and being arranged to be contracted to clamp the stick in the bore, a gland nut threading on the end of said holder with the stick extending therethrough, said nut when tightened serving to clamp the stick in adjusted position, and means for supplying electric current to the stick to heat the same at the tip thereof when it makes grounding contact with the work.

21. A soldering tool as set forth in claim 20 wherein the carbon stick is provided with a passage extending longitudinally therethrough for the purpose of feeding solder through the stick to the tip thereof.

22. An electric soldering tool comprising a holder of pistol form arranged to be held in the hand like a pistol, a hollow cored carbon stick serving as the soldering element mounted in the barrel portion of said holder with the tip thereof exposed for contact with the work, said stick being arranged to be adjusted gradually outwardly as the tip burns away, means for fastening the stick in adjusted position in the barrel, solder in wire or equivalent form being arranged to feed through the core of said stick to the tip, and means for supplying electric current to the stick whereby to heat the same at the tip when it makes grounding contact with the work, so as to melt the solder to flow onto the work.

23. An electric soldering tool comprising a holder of pistol form arranged to be held in the hand like a pistol, said holder having at least the barrel portion thereof made in two halves dividing the same in a longitudinal median plane, a sleeve-like member fitting on the muzzle end of said barrel and serving to hold the halves together, a carbon stick slidably received in the bore of said barrel and projecting through the sleeve member, said sleeve being arranged to be tightened on the muzzle to draw the halves of the barrel together to clamp the stick in adjusted position, and means for supplying electric current to said stick whereby to heat the same at the tip thereof when it makes grounding contact with the work.

24. A soldering tool as set forth in claim 23, wherein the carbon stick is provided with a passage extending longitudinally thereto for the purpose of feeding solder through the stick to the tip thereof, the same being arranged to be melted in the heating of the tip of said stick when it makes grounding contact with the work.

25. An electric soldering tool comprising an elongated holder providing a longitudinal bore, a carbon stick soldering element slidably received in said bore leaving the tip thereof exposed for contact with the work, the said holder being split and being arranged to be contracted to clamp the stick in the bore, a sleeve-like member fitting over the end of said holder with the stick extending therethrough, said sleeve when tightened serving to clamp the stick in adjusted position, and means for supplying electric current to the tip to heat the same at the tip thereof when it makes grounding contact with the work.

26. A soldering tool as set forth in claim 25, wherein the carbon stick is provided with a passage extending longitudinally therethrough for the purpose of feeding solder through the stick to the tip thereof.

27. An electric soldering tool comprising a holder of piston-like form arranged to be held in the hand like a pistol, a carbon stick serving as the soldering element mounted in the barrel portion of said holder with the tip thereof reaching from the muzzle for contact with the work, means for supplying electric current to the stick whereby to heat the same at the tip when it makes grounding contact with the work, and a spool of solder in wire form mounted on the butt portion of the holder, the solder wire being extended from said spool through a longitudinal passage provided in the stick whereby to deliver solder to the tip to be melted when the tip is heated.

28. An electric soldering tool comprising a holder of pistol-like form arranged to be held in the hand like a pistol, a carbon stick serving as the soldering element mounted in the barrel portion of said holder with the tip thereof reaching from the muzzle for contact with the work, means for supplying electric current to the stick whereby to heat the same at the tip when it makes grounding contact with the work, a spool of solder in wire form mounted on the butt portion of the holder, the solder wire being extended from said spool through a longitudinal passage provided in the stick whereby to deliver solder to the tip to be melted when the tip is heated, and solder feed means in the butt portion of said holder operable similarly to a trigger.

29. An electric soldering tool comprising a holder of pistol-like form arranged to be held in the hand like a pistol, a carbon stick serving as the soldering element mounted in the barrel portion of said holder with the tip thereof reaching from the muzzle for contact with the work, means for supplying electric current to the stick whereby to heat the same at the tip when it makes grounding contact with the work, solder in wire form being arranged to feed through a longitudinal passage provided in said stick whereby to deliver solder to the tip to be melted when the tip is heated, and feed means on the butt portion of said holder operable similarly to a trigger, and having frictional engagement directly with the solder wire to feed the same forwardly through the stick.

In witness of the foregoing we affix our signatures.

DARRELL B. LINVILLE.
BERT C. CANTY.